United States Patent [19]

Hentschel et al.

[11] 4,000,410
[45] Dec. 28, 1976

[54] CIRCUIT ARRANGEMENT FOR SUPERPOSING STARTING CONDITIONS AT AN ELECTRICAL OPERATING MEANS-SIMULATOR COMPOSED OF RC-ELEMENTS

[75] Inventors: Michael Hentschel, Hannover, Germany; Heinz Unterweger, Buchs, Switzerland

[73] Assignee: Sprecher & Schuh AG, Aarau, Switzerland

[22] Filed: Nov. 11, 1975

[21] Appl. No.: 631,156

[30] Foreign Application Priority Data

Nov. 13, 1974 Switzerland .................... 15144/74

[52] U.S. Cl. ........................ 307/202 R; 235/184; 307/235 C; 324/158 R; 328/127
[51] Int. Cl.[2] .................... H02H 7/20; H02H 7/08
[58] Field of Search ........ 307/235 B, 235 C, 235 F, 307/235 J, 235 K, 246, 310, 200, 202; 328/146, 147, 7, 151, 127, 259; 324/158 R, 158 MG; 235/184, 185, 151.31; 318/334, 471–473; 323/68, 69, 100; 340/410; 317/40 R, 13 R, 14 R

[56] References Cited

UNITED STATES PATENTS 3,573,451    4/1971    Fricke, Jr. et al. ............ 328/127 X

*Primary Examiner*—John Zazworsky
*Attorney, Agent, or Firm*—Haseltine, Lake & Waters

[57] ABSTRACT

A circuit arrangement for superposing or impressing starting conditions at an electrical operating means primary simulator composed of RC-elements wherein the primary simulator network is charged by a charging current functionally dependent upon an operating current to a charging voltage representative of the heating-up or thermal behavior of the operating means and the charging voltage appears at a low-ohmic or low-impedance output of a charging state-storage device for controlling an electronic operating means-protection relay. According to the invention, an auxiliary simulator composed of an RC-element, and the time-constant of which is greater than one-half the smallest time-constant of the primary simulator and smaller than twice the largest time-constant of the primary simulator, is connected by means of a switching means or device responsive to the supply voltage with the charging state-storage device when the protection relay-power supply is intact for adjusting the charging voltage of the auxiliary simulator-capacitor to the charging voltage of the primary simulator and is disconnected from undesired discharges in the case of a defective or faulty protection relay-power supply. Upon recurrence of the protection relay-power supply the auxiliary simulator is temporarily connected through the agency of an impedance converter with the primary simulator for recharging the primary simulator-capacitor of its first RC-element to the charging voltage of the auxiliary simulator.

11 Claims, 6 Drawing Figures

CIRCUIT ARRANGEMENT FOR SUPERPOSING STARTING CONDITIONS AT AN ELECTRICAL OPERATING MEANS-SIMULATOR COMPOSED OF RC-ELEMENTS

BACKGROUND OF THE INVENTION

The present invention relates to a new and improved circuit arrangement for superposing or impressing starting or start-up conditions upon an electrical operating means-simulator composed of RC-elements wherein the simulator network is charged by a charging current wich is functionally dependent upon the operating current to a charging voltage representative of the heating-up or thermal behavior of the electrical operating means and the charging voltage appears at a low-ohmic output of a charging state-storage device for controlling an electronic operating means-protection relay.

In the case of electrical simulators for operating means or equipment, especially motors and transformers, there is simulated by means of the capacitance of the first RC-element the copper-thermal capacity, by means of the capacitance of the second RC-element the iron-thermal capacity, and by means of the resistances of the RC-elements the corresponding thermal transfer resistances of the electrical operating means. With such an electrical simulator and by supplying the RC-elements with a charging current, the current intensity of which is proportional to the square of the operating current intensity, and with proper dimensioning (time-constants), it is possible to detect the thermal behavior of the operating means brought about by electrical losses in such a satisfactory manner that the charging voltage of the simulator sufficiently accurately reflects the momentary temperature of the operating means for the control of the subsequently connected protection relay.

In order to obtain greater accuracy of the simulator with an acceptable expenditure in electrical components or equipment, the charging current is advantageously delivered in a clocked fashion via a switch and the low or bottom ends of the simulator capacitors are at a direct-current potential in order to prevent leakage currents at the trigger point. In this regard attention is directed to Swiss Pat. No. 540,587, the disclosure of which is incorporated herein by reference. For the purpose of accommodating the first simulator capacitance to the thermal capacity of the motor which is to be momentarily protected the effective capacitance of the capacitor is advantageously influenced with the aid of electronic means, for instance as taught in the aforementioned Swiss Pat. No. 540,587, and also the different cooling behavior of the object to be protected when the same is running and at standstill is taken into consideration by advantageously electronically influencing the simulator resistances. In the case of failure of the supply voltage or power supply for the protection relay, the circuits for influencing the effective capacitance and the effective thermal resistances become inactive and the capacitors discharge in the direction of the low or bottom ends which are at higher direct-current potential or voltage during normal operation, so that upon the re-appearance or recurrence of the supply voltage the simulator voltage corresponds to a heated-up object which is to be protected. Moreover, the electronic switch, through the agency of which there is delivered the charging current of the simulator, becomes conductive when there is a breakdown in the supply voltage, so that there also occur discharge operations thereacross. In the case of a starting charging voltage which is too high in relation to the actual temperature of the electrical operating means there can result too early shutting-down of the operating means by the protection relay, and in the case of a starting charging voltage which is too low there can result a shutting-down of such operating means which is too late by means of the protection relay. For a permissible mode of operation of the electrical operating means-protection relay, measures therefore must be taken to insure that after each interruption in the supply voltage there are present the proper starting conditions at the electrical simulator. This can be basically obtained in two different ways: Either the circuit arrangement containing the simulator is designed such that after every interruption in the voltage supply there are automatically present the proper starting conditions, or after each interruption in the voltage supply the starting conditions are impressed or superposed at the simulator. In the first case there is necessary for the current supply of the circuit arrangement a separate current source, the provision of which generally however is undesired. In the second case, and with which the present invention is concerned, there is present the problem of having to distribute a starting condition to two simulator capacitors. A correct distribution of a starting or start-up condition to two (or more) simulator capacitors, however, is not possible at least with the means which are still economically feasible for such circuit arrangements.

SUMMARY OF THE INVENTION

Hence, it is a primary object of the present invention to provide a new and improved circuit arrangement for superimposing starting or start-up conditions at an electrical operating means-simulator composed of RC-elements in a manner not associated with the aforementioned drawbacks and limitations of the prior art proposals.

Another and more specific object of the present invention aims at providing a relatively simple construction of circuit arrangement for impressing starting conditions upon an electrical operating means-simulator composed of RC-elements insuring for a sufficiently accurate approximation of the correctness of the momentarily impressed starting conditions.

A further object of the present invention aims at the provision of a new and improved construction of circuit arrangement for impressing or superposing starting conditions upon a simulator for electrical equipment, which circuit arrangement is relatively simple in construction and design, extremely reliable in operation, relatively inexpensive, and provides for extremely accurate simulation of given operating characteristics of the electrical equipment.

Now in order to implement these and still further objects of the invention, which will become more readily apparent as the description proceeds, the circuit arrangement of the present invention is manifested by the features of an auxiliary simulator composed of a RC-element, the time-constant of which is greater than one-half of the smallest time-constant of the primary simulator and smaller than twice the largest time-constant of the primary simulator. Further, there is provided a switch or switching device responsive to the supply voltage which, when the power supply for the protection relay is intact, connects the auxiliary simulator with the output of the charging state-storage device in order to readjust the charging voltage of the auxiliary simulator-capacitor to the charging voltage of the primary simulator and in the case of a faulty protection relay-power supply the auxiliary simulator is disconnected from undesired discharges. Upon return or recurrence of the power supply for the protection relay the auxiliary simulator is temporarily connected through the agency of an impedance converter with the primary simulator for recharging the primary simulator-capacitor of its first RC-element to the charging voltage of the auxiliary simulator.

With this circuit arrangement, during normal operation of the electrical operating means, the charging voltage of the auxiliary simulator is positively or rigidly adjusted to follow the charging voltage of the primary simulator practically without any time-delay. In the event of an interruption or breakdown in the supply voltage there is a discharge of the auxiliary simulator-capacitor possessing the large time-constant of the auxiliary simulator and its discharge voltage provides the starting or start-up conditions for the primary simulator upon return of the operating voltage. With such return or recurrence of the operating voltage then the charging voltage of the auxiliary simulator is transmitted to the first primary simulator-capacitor (copper thermal capacity). Since, owing to the large time-constant of the auxiliary simulator, the charging voltage of which is practically invariable after a comparitively brief interruption in the supply voltage, the starting conditions for such brief or short-time interruptions are to be considered as correct, and there do not occur any problems. With the only one time-constant of the auxiliary simulator it is not possible to provide correct starting or start-up conditions after interruptions in the supply voltage of intermediate duration. Upon renewed switching-in there is falsified a higher temperature of the electrical operating means or equipment, so that the circuit arrangement has a built-in safety factor. Similarly, upon the renewed switching-in after an interruption over a longer period of time, there can be falsified too high a temperature of the electrical operating means owing to the recharging of the simulator network. These incorrect starting or start-up conditions do not, however, lead to the necessity of having to differentiate between short-time interruptions and long-time interruptions, rendering possible a simple construction of the circuitry. The too high temperature of the operating means which is falsified or simulated after interruption over a longer period of time can be reduced by a somewhat lower than optimum bottom or low end voltage at the second capacitor of the primary or main simulator. In the primary simulator a diode can be connected in parallel with the simulator resistor of the first RC-element, across which there can discharge the simulator capacitor of the second RC-element during superposing of the starting conditions when its voltage is more positive than the charging voltage appearing at the simulator capacitor of the first RC-element. In this case there can be applied to the simulator capacitor of the second RC-element its optimum low or bottom end voltage and the starting condition is also then correct following interruptions lasting over a longer period of time.

BRIEF DESCRIPTION OF THE DRAWINGS

The invention will be better understood and objects other then those set forth above, will become apparent when consideration is given to the following detailed description thereof. Such description makes reference to the annexed drawings wherein.

DETAILED DESCRIPTION OF THE INVENTION

Figure 1:
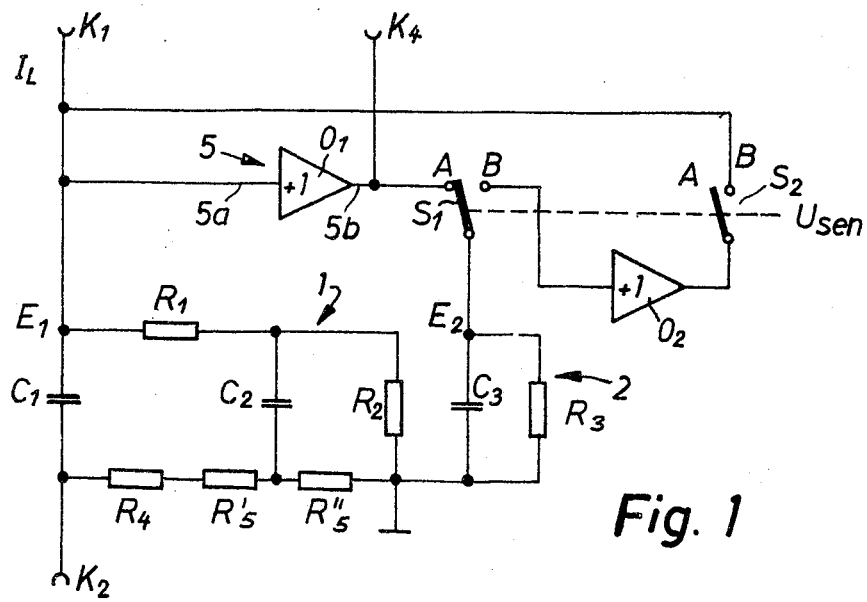
FIG. 1 schematically illustrates a circuit diagram of an exemplary construction of a circuit arrangement for superposing or impressing starting or start-up conditions upon a motor simulator composed of two RC-elements wherein for such superposing operation there is only taken into account the simulator capacitor of the first RC-element.
Figure 2:
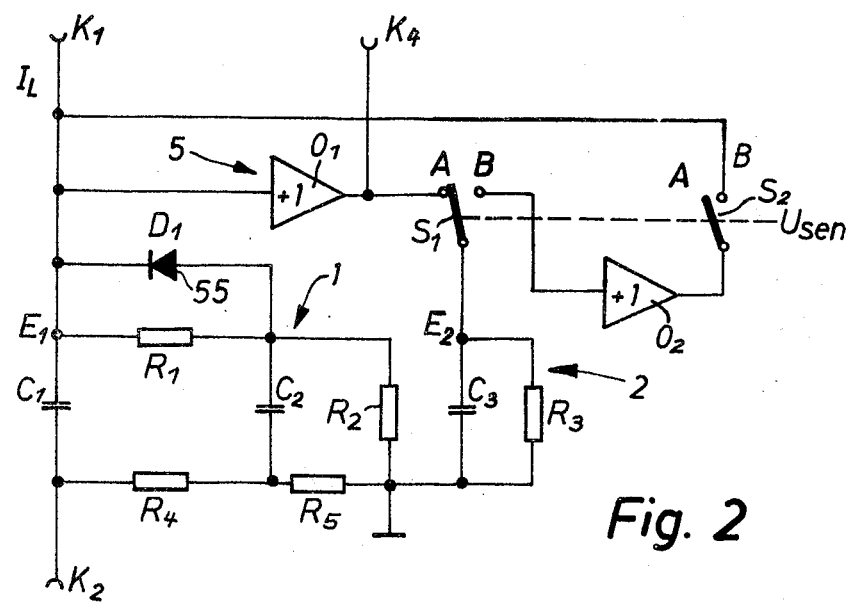
FIG. 2 schematically illustrates a circuit diagram of an exemplary construction of a circuit arrangement wherein for the superposing or impressing operation there is also taken into account the simulator capacitor of the second RC-element.

Describing now the drawings, the schematic circuit diagrams of the start-up impressing or superposing-circuit arrangements for an electrical operating means as illustrated in FIGS. 1 and 2 only possess slight constructional differences from one another. In both circuit arrangements the primary or main simulator 1 comprises a first RC-element $R_1$, $C_1$ and a second RC-element $R_2$, $C_2$. By means of the capacitance of the second capacitor $C_2$ there can be simulated the iron-thermal capacity, for instance of a motor, and by means of the capacitance of the first capacitor $C_1$ the copper-thermal capacity. The first capacitor $C_1$ of the primary simulator 1 is connected at one terminal with a connection terminal $K_1$ and at the other terminal with a connection terminal $K_2$. By means of the connection terminal $K_1$ the primary simulator 1 is charged to a charging current $I_L$, the current intensity of which, for instance, is proportional to the square of the motor-operating current-intensity. At the terminal $K_2$ thre is applied a reference voltage which forms the low or bottom end voltage or potential for the first capacitor $C_1$. The second resistor $R_2$ of the primary simulator 1 is connected with ground and between the terminal $K_2$ and ground there is connected a voltage divider embodying the resistors $R_4$, $R'_5$, $R''_5$ (FIG. 1) and $R_4$, $R_5$ (FIG. 2), from which there is tapped-off the low end voltage for the second capacitor $C_2$ of the primary simulator 1. The charging voltage of the first capacitor $C_1$ is of low resistance or low-ohmic at the output of a charging state-storage device 5. In the simplest case the charging state-storage device 5 consists of an impedance converter $O_1$ which is connected at the input side $5a$ with the input-circuit point $E_1$ of the primary simulator 1 and the output voltage appearing at the output $5b$ and which is proportional to the charging voltage of the capacitor $C_1$ is applied to a connection terminal $K_4$.

Connected with such simulator-circuit arrangement, the construction of which is known to the art, is the circuit arrangement for superposing or impressing the starting or start-up conditions and which contains an auxiliary simulator 2 composed of a parallel RC-element $R_3$, $C_3$, a signal-controlled electronic switching or switching device $S_1$, $S_2$ and an impedance converter $O_2$. The electronic switching device $S_1$, $S_2$ possesses two effective switching conditions or states. In the first switching state A of the switching device $S_1$, $S_2$ the auxiliary simulator 2, which is connected by means of its low or bottom end with ground, is coupled with the output 5b of the charging state-storage device 5. In the second switching state B of the switching device $S_1$, $S_2$ the auxiliary simulator 2 is connected via the impedance converter $O_2$ with the input-circuit point $E_1$ of the primary simulator 1.

The electronic switching device or switch means $S_1$, $S_2$ responds to, for instance, a control signal $U_{sen}$ which is derived from the supply voltage (network voltage). The control signal $U_{sen}$ is preferably a threshold value signal which possesses the peak null when the supply voltage is below a certain threshold value. As long as the supply voltage is above the threshold value, that is to say, with the current supply being intact or operative, then the switching device is placed into its first switching state A. As soon as the supply voltage drops below the threshold value which would occur for instance upon interruption of the current, then the switching device $S_1$, $S_2$ shifts into its second switching state B. The switching back into the switching state A upon the recurrence of the supply voltage or power supply occurs with a time-delay, in other words after a certain time-span following the point in time when the recurring supply voltage has exceeded the threshold value.

The dimensioning of both simulators 1 and 2 is dependent upon the thermal behavior of the relevant electrical operating means or piece of equipment in question. Since with the capacitance of the first capacitor $C_1$ there can be simulated the copper thermal capacity and with the capacitance of the capacitor $C_2$ the iron thermal capacity, the second RC-element $R_2$, $C_2$ of the primary simulator 1 possesses a larger time-constant than the first RC-element $R_1$, $C_1$. The time-constant of the auxiliary simulator 2 approximately corresponds to the time-constant of the second RC-element $R_2$, $C_2$ of the primary simulator 1.

To the extent previously described both of the circuit arrangements of FIGS. 1 and 2 are identical, with the exception of the low or bottom end voltage applied to the second capacitor $C_2$ of the primary simulator 1. With the circuit arrangement of FIG. 1, during the switching state B of the electronic switching device $S_1$, $S_2$, the charging voltage of the auxiliary simulator-capacitor $C_3$ forming the starting condition is only impressed upon the first capacitor $C_1$ of the primary simulator 1. The second capacitor $C_2$ of the primary simulator 1 is not utilized during this superposing or impressing operation.

With the circuit arrangement of FIG. 2 in the primary simulator 1 the second capacitor $C_2$ is electrically connected via a diode $D_1$ through the agency of the input-circuit point or junction $E_1$ with the first capacitor $C_1$, and the diode $D_1$ is connected at the side of the anode with the capacitor $C_2$. If during the superposing operation the charging voltage of first capacitor $C_1$ drops then voltage the charged second capacitor $C_2$ is more positive than that of the first capacitor $C_1$ and therefore also more positive than the charging voltage of the auxiliary simulator capacitor $C_3$. In this case the capacitor $C_2$ will discharge via diode $D_1$ and there occurs a recharging of the capacitor $C_2$ so that the second capacitor $C_2$ of the primary simulator 1 is utilized in the superposing or impressing operation (at one side). In this circuit arrangement the second capacitor $C_2$ of the primary simulator 1 is placed at its optimum low or bottom end voltage by means of the voltage divider $R_4$, $R_5$, to which end the voltage divider contains, for example, the resistances $R_4 = x.R_1$ and $R_5 = x.R_2$.

The "optimum low end potential" makes the capacitors "voltage-free" whereby leakage currents are avoided. The terminals of capacitor $C_2$ are connected to two different voltage dividers $R_1$, $R_2$ and $R_4$, $R_5$. That $C_1$ and $C_2$ become simultaneously "voltage-free" there must be $R_1/R_2 = R_4/R_5$. The resistances $R_4$ and $R_5$ have to be much smaller than the resistances $R_1$ and $R_2$, otherwise the RC-simulator would be disturbed. Equation $R_4/R_1 = R_5/R_2 = x$, $x$ constant e.g. $10^{-3}$, fulfills these conditions.

In the equations $R_4 = x\ R_1$ and $R_5 = x\ R_2$ $x$ is a constant factor, the magnitude of which influences the fault within the RC-circuitry caused by the resistors; the smaller $x$ the smaller also faults within the RC-circuitry. In practice the faults are negligible if $x$ is chosen in the order of $10^{-3}$. The equations (lines 28, 29) should be replaced by $R_4 + R_5' = \frac{1}{2}\ x.R_2$, where $R_4 = x.R_1$, and $R_5'' = \frac{1}{2}\ x.R_2$. $x$ may be replaced by another letter, e.g. $a$, to denote that it is a constant factor.

With the circuit arrangement of FIG. 1 the low or bottom end of the second capacitor $C_2$ is at somewhat lower potential due to the action of the voltage divider, so that the voltage divider contains, for instance, the resistance $(R_4 = x.R_1) + R'_5 = \frac{1}{2}\ x.R_2)$ and $R''_5 = \frac{1}{2}\ x.R_2$.

Figure 3:
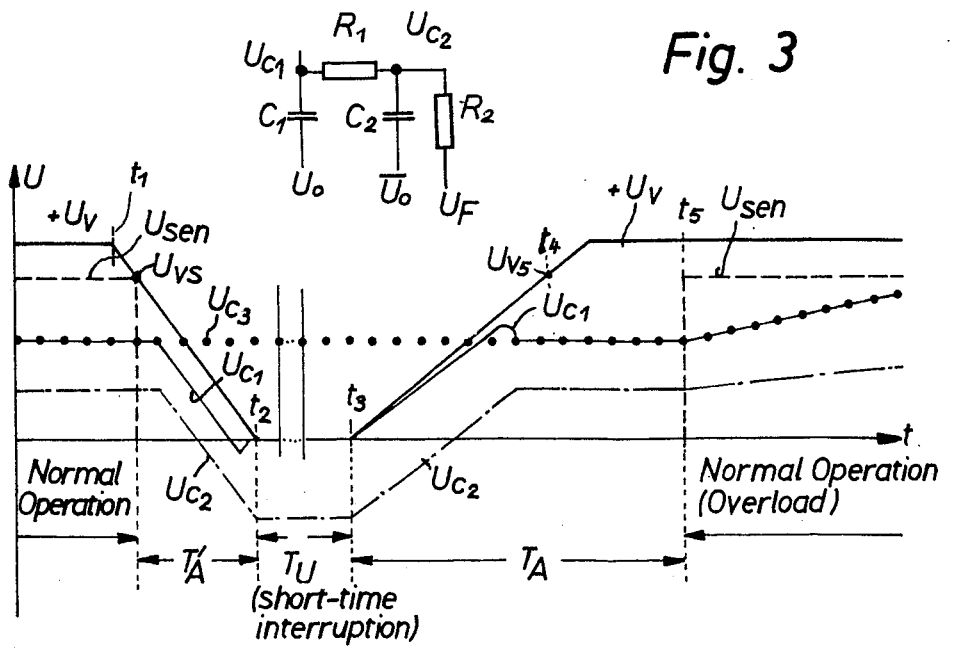
FIG. 3 is a graph plotting voltage as a function of time for the motor simulator composed of two RC-elements in the case of changes as a function of time of certain voltages occurring upon interruption of the motor current over a short period of time.
Figure 4:
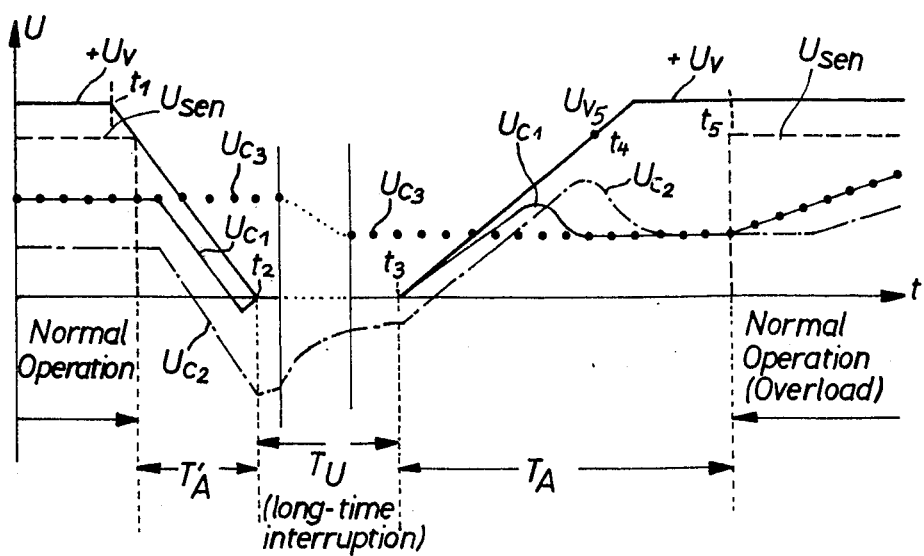
FIG. 4 is a graph plotting voltage as a function of time for the voltages changing as a function of time and portrayed in the graph of FIG. 3, but this time for an interruption of the motor current lasting over a longer period of time.

In order to explain the mode of operation of both of these circuits reference is now made to the graphs of FIGS. 3 and 4 where there have been illustrated for a single phase supply voltage $+U_V$ derived from the power network, the charging voltage $U_{C1}$ of the first capacitor $C_1$ of the primary simulator 1, the charging voltage $U_{C2}$ of the second capacitor $C_2$ of such primary simulator, the charging voltage $U_{C3}$ of the capacitor $C_3$ of the auxiliary simulator 2, and the control voltage $U_{sen}$ for the electronic switching device $S_1$, $S_2$. In particular, FIG. 3 illustrates the voltage curves during the course of a power failure lasting for a short period of time and FIG. 4 the voltage curves during a power failure lasting for a longer period of time.

With intact current supply for the protection relay, i.e. such current supply is not interrupted, there is then present at the circuit arrangement the entire supply voltage $+U_V$, so that the electronic switching device $S_1$, $S_2$ is controlled with the voltage peak $U_{sen}$ of the control voltage and thus assumes the switching state A where the auxiliary simulator 2 is connected with the output 5b of the charging state-storage device 5. The charging voltage $U_{C3}$ of the auxiliary simulator-capacitor $C_3$ is equal to the charging voltage $U_{C1}$ of the capacitor $C_1$ of the primary simulator 1 and the charging voltage $U_{C2}$ appearing at the second capacitor $C_2$ is lower than the charging voltage $U_{C1}$ of the first capacitor $C_1$. These conditions have been reproduced at the graphs located at the left side of the section marked "Normal Operation". Owing to the single-phase removal of the supply voltage $+U_V$ from the power network (for instance by means of conventional transformers with rectifiers and stabilizers), in the case of an interruption or breakdown in the power supply network at time $t_1$ the supply voltage $+U_V$ begins to drop and upon reaching the threshold value $U_{VS}$ the control voltage $U_{sen}$ assumes the value null. Consequently, the auxiliary simulator 2 is connected by means of the switching device $S_1$, $S_2$ with the impedance converter $O_2$ and via such with the first capacitor $C_1$ of the primary simulator 1.

Now owing to the still available supply voltage the groups of components of the circuit arrangement initially remain active, at the moment of switching there already begins the superposing or impression of the charging voltage of the auxiliary simulator-capacitor $C_3$ at the primary simulator 1. This superposing operation takes place during the time span $T'_A$ which approximately lasts until there is a drop to null of the supply voltage $+U_V$ (time $t_2$), however is without influence upon the accuracy of the circuit arrangement because the charging of the first capacitor $C_1$ with the supply voltage null can be readily decayed and in this case it is not possible to influence the second capacitor $C_2$. The interruption time $T_U$ of the circuit arrangement is completed by the recurrent or reappearing supply voltage $+U_V$ (time $t_3$). Due to the ascending supply voltage $+U_V$ the assembly of components of the circuit arrangement are activated, there begins the superposing of the charging voltage of the auxiliary simulator-capacitor $C_3$ upon the primary simulator 1. The assembly of components which participate in the superposing or impression of the circuit arrangement are activated at different minimum voltages or potentials, so that there can arise irregularities in the transmission of the auxiliary simulator voltage to the primary simulator 1. By virtue of an irregular transition or transfer behavior of the participating assembly of components, it is possible, upon the recurrence of the voltage, that the first capacitor $C_1$ of the primary simulator 1 becomes overly recharged. For this reason and due to the occurring recharging time-constant the superposing operation is not already interrupted at the time $t_4$, when the ascending supply voltage $+U_V$ exceeds the threshold value $U_{VS}$ by switching the auxiliary simulator 2 to the charging state-storage device 5, rather first at a later time $t_5$. In this way, the superposing time $T_A$ is sufficient in order, for instance, by virtue of a short-time activation of the charging current source, to carry out a charging of the first capacitor $C_1$ back to the reference value, so as to obtain a charging state of the primary simulator 1 at the time of switching-over to the normal operation which corresponds to the desired accuracy. With the one large time-constant of the auxiliary simulator 2 the thermal behavior of the motor is only approximately correctly determined when it is at standstill, and, for instance, there is not taken into account compensation of the copper temperature to that of the iron.

In the case of a brief or short interruption (FIG. 3) the actual motor temperature is still simulated accurately enough by means of the charging voltage of the auxiliary simulator 2 and also the undesired recharging of the capacitor $C_2$ occurring during the interruption time and the thus resultant error for the starting condition can still be neglected, so that for both circuit arrangements (FIGS. 1 and 2) upon again switching-in the same after the superposing operation the charging state of the primary simulator 1 correctly corresponds to that prevailing directly prior to the interruption.

Since the auxiliary simulator 2 possesses a large time-constant and in contrast thereto there rather rapidly occurs the temperature compensation of copper to iron, in the case of operating current interruptions of average duration there is falsified or simulated a somewhat higher motor temperature during a renewed switching-in operation.

In the case of interruptions lasting over a longer time-span the error in the starting conditions of the capacitor $C_2$ is of significance. With the circuit arrangement of FIG. 1 this feedback or reactive effect can be suppressed to such an extent, by placing at a lower potential the low or bottom end of the capacitor $C_2$, that also a difficult start-up of the motor after switching-in cannot lead to a premature triggering of the protection relay. With the circuit arrangement of FIG. 2, where both of the capacitors $C_1$ and $C_2$ of the primary simulator 1 have applied thereto optimum low end voltages or potentials and are connected with one another by means of the diode $D_1$, therefore as best recognized by referring to the graph of FIG. 4, the primary simulator 1 is set to the proper starting conditions.

Figure 5:
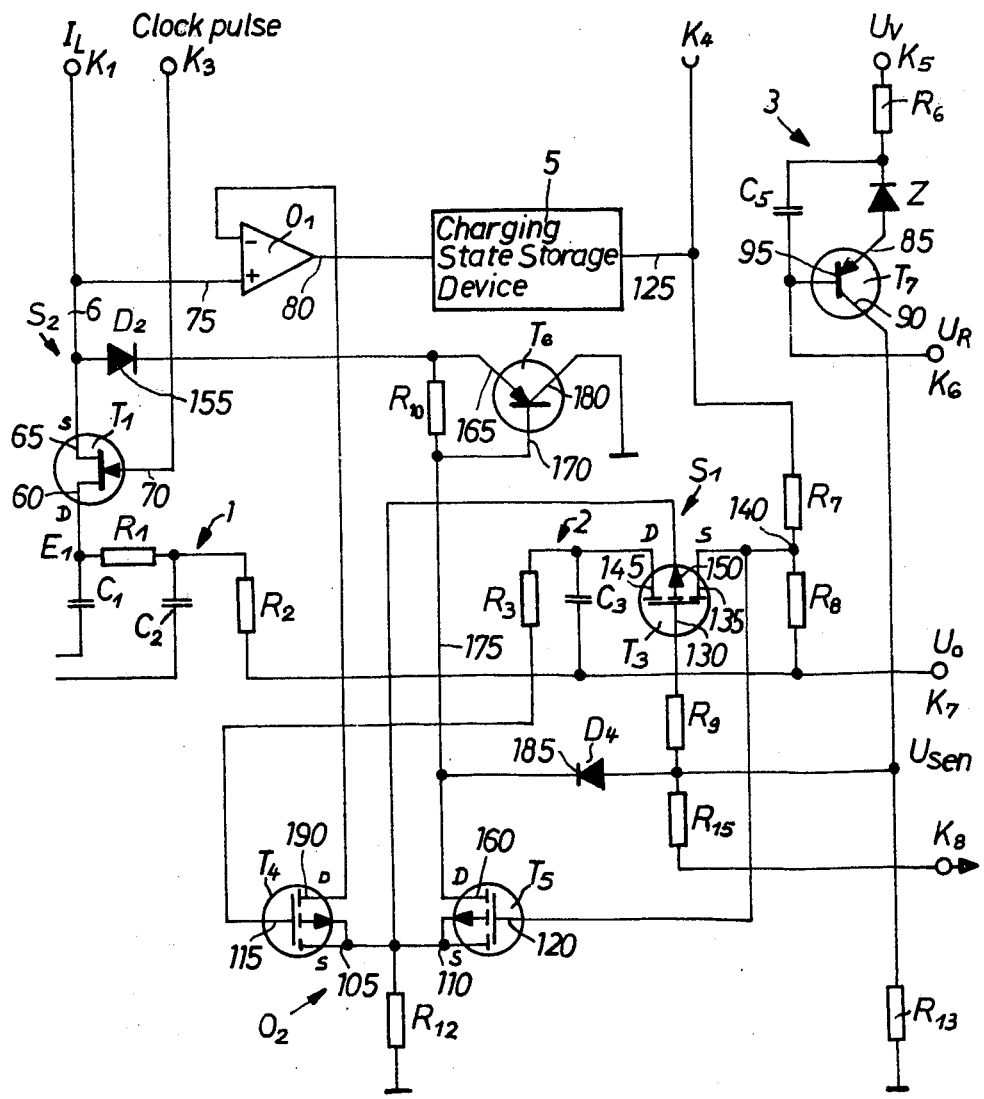
FIG. 5 is a circuit diagram of a first exemplary embodiment of circuit arrangement for superposing or impressing starting conditions as contemplated by the invention.
Figure 6:
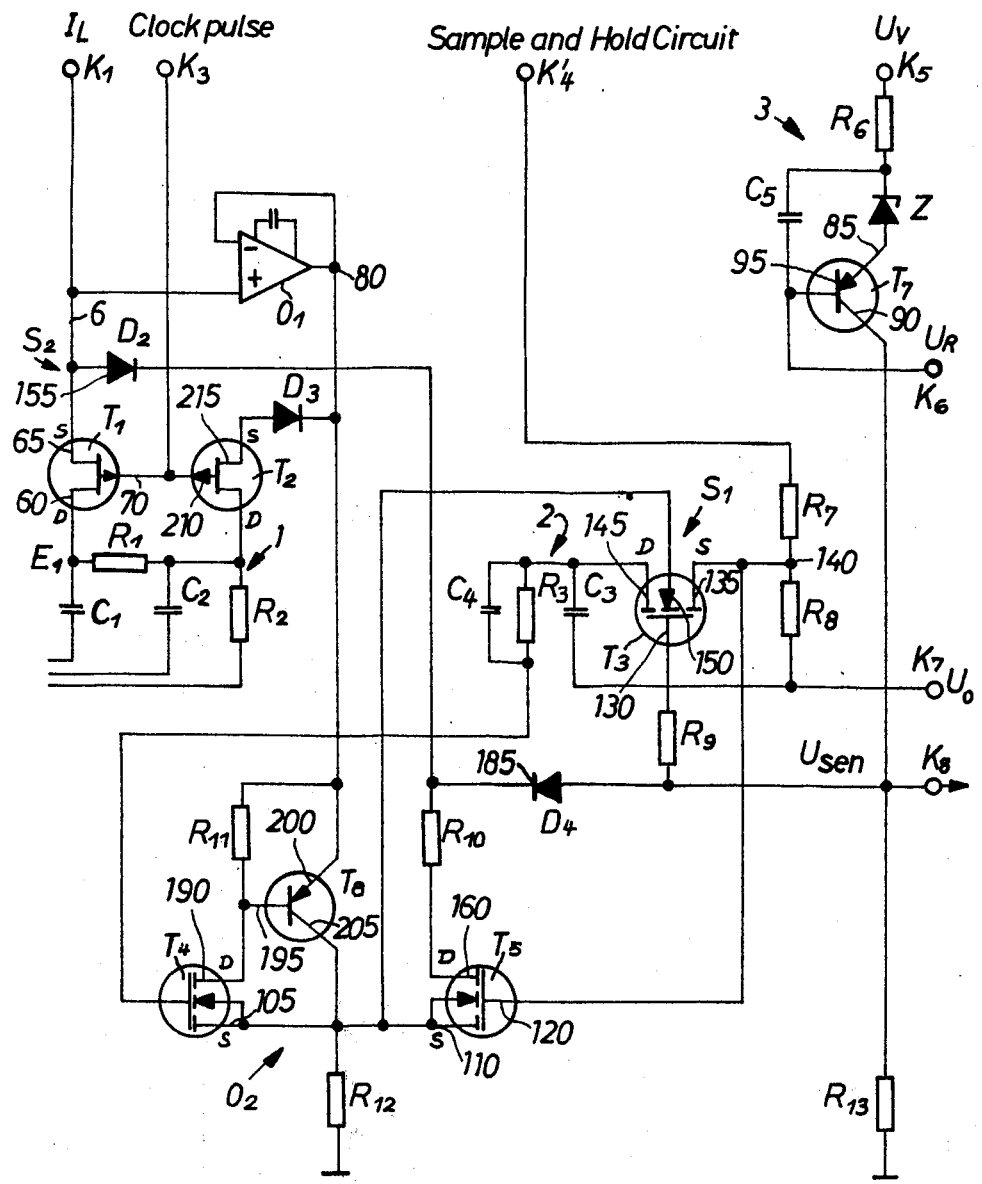
FIG. 6 is a circuit diagram of a second exemplary embodiment of circuit arrangement designed according to the teachings of the present invention.

As concerns the circuit arrangements shown in FIGS. 1 and 2 merely with regard to their basic construction, the circuit diagrams or circuitry of FIGS. 5 and 6 illustrate two practical exemplary embodiments. In both circuit arrangements there is provided a primary or main simulator 1 supplied by a clocked charging current $I_L$ and composed of a first RC-element $R_1$, $C_1$ and a second RC-element $R_2$, $C_2$. The input-circuit point or junction $E_1$ of the primary simulator 1 is connected via the drain-source-path 60, 65 of a field-effect transistor $T_1$ with the connection terminal $K_1$. The gate 70 of the field-effect transistor $T_1$ has delivered thereto clock pulses via the connection terminal $K_3$. Furthermore, at the connection terminal $K_1$ there is connected the non-inverting input 75 of an impedance converter $O_1$. The supply of the charging state of the primary simulator 1, with the circuit arrangement of FIG. 5, takes place by means of a charging state-storage device or charging stage storage 5 which is connected with the output 80 of the impedance converter $O_1$, with the circuit arrangement of FIG. 6 by a sample and hold circuit which may be of the type disclosed in the commonly assigned, U.S. application Ser. No. 360,377 filed May 11, 1973 U.S. Pat. No. 3,808,516) and entitled "Sample And Hold-Circuit Arrangement For An Electrical Motor Simulator Of An Electronic Motor Protection Relay", the disclosure of which is incorporated herein by reference. To this extent both of the circuit arrangements are conventional.

The control signals $U_{sen}$ are produced by a voltage sensor 3 which, in the illustrated exemplary embodiments, contains a pnp-transistor $T_7$. The emitter 85 of this transmitter $T_7$ is connected via a Zener diode Z and a resistor $R_6$ with the connection terminal $K_5$ at where there is applied the supply voltage $+U_V$, the collector 90 is connected through the agency of a resistor $R_{13}$ with ground, and at the base 95 of the transistor $T_7$ which is connected via a capacitor $C_5$ with the cathode 100 of the Zener diode Z and the resistor $R_6$ there is applied via the connection terminal $K_6$ a reference voltage $U_R$. The Zener diode Z determines the threshold value $U_{VS}$. The impedance converter $O_2$ comprises a differential amplifier constituted by the MOSFETs $T_4$ and $T_5$ (metal oxide semiconductor field-effect transistors), the substrate- and source-electrodes 105 and 110, respectively, are commonly applied to ground via a resistor $R_{12}$. At the gate 115 of the one MOSFET $T_4$ there is connected the resistor $R_3$ of the auxiliary simulator 2 and at the gate 120 of the other MOSFET $T_5$ there is applied a fraction of the charging voltage of the first primary simulator-capacitor $C_1$ — which fraction of the charging voltage is tapped-off of the voltage divider $R_7$, $R_8$ — wherein the voltage divider $R_7$, $R_8$, with the circuit arrangement of FIG. 5, is connected with the output 125 of the charging state-storage device 5, and with the circuit arrangement of FIG. 6 via the connection terminal $K'_4$ with the thus labeled sample and hold circuit. The differential amplifier $T_4$, $T_5$ therefore compares the charging voltage of the auxiliary simulator 2 with a fraction of the charging voltage of the first primary simulator-capacitor $C_1$.

With these exemplary embodiments, the switching element $S_1$ of the switching means or device $S_1$, $S_2$ (FIGS. 1 and 2) connecting the auxiliary simulator 2 (via the voltage divider $R_7$, $R_8$) with the charging state-storage device 5 (FIG. 5) and at the sample and hold circuit (FIG. 6), respectively, comprises a MOSFET $T_3$, at the gate 130 of which there is applied via a resistor $R_9$ the control signal $U_{sen}$ which is tapped-off of the voltage sensor 3. The source-electrode 135 of MOSFET $T_3$ is connected with the center tap 140 of the voltage divider $R_7$, $R_8$ and the drain-electrode 145 is connected with the resistor $R_3$ and the capacitor $C_3$ of the auxiliary simulator 2 and its substrate 150 is connected with the already mentioned resistor $R_{12}$. At the voltage divider $R_7$, $R_8$ and the capacitor $C_3$ of the auxiliary simulator 2 there is applied through the agency of the connection terminal $K_7$ a "null voltage" of for instance 3 volts. The switching element $S_2$ of the switching device $S_1$, $S_2$ (FIGS. 1 and 2), and which switching elements $S_2$ connects the auxiliary simulator 2 with the primary simulator 1, in this case consists of two diodes $D_2$, $D_4$. The one diode $D_2$ is connected by means of its anode 155 at the conductor or line 6 connecting the drain-source-path 60,65 of the field-effect transistor $T_1$ coupled with the primary simulator 1 with the terminal connection $K_1$ for the charging current source and with which there is also connected via such conductor 6 the non-inverting input 75 of the impedance converter $O_1$. This conductor or line 6 is connected via the diode $D_2$ and a resistor $R_{10}$ with the drain-electrode 160 of the MOSFET $T_5$ of the differential amplifier $O_2$ and via the second diode $D_4$ there is delivered to the first-mentioned diode $D_2$ in the form of a reverse or backlash voltage the control signal $U_{sen}$ which is tapped-off of the voltage sensor 3.

In the circuit arrangement of FIG. 5 there are utilized n-channel-MOSFETs of the enhancement-type. The illustrated circuit arrangement corresponds to that of FIG. 1. Just as was the case for the circuitry of FIG. 2 in the primary simulator 1 there can be connected in parallel with the resistor $R_1$ a diode for "one-side impressing or superposing". The transistor $T_1$ which is connected with the primary simulator 1 for its clocked supply is a p-channel-field-effect transistor (FET). The emitter-base-path 165, 170 of a pnp-transistor $T_6$ is connected in parallel with the resistor $R_{10}$ in the drain line or conductor 175 of the differential amplifier-MOSFET $T_5$, and the collector 180 of the pnp-transistor $T_6$ is connected with ground. The diode $D_4$ is connected by means of its cathode 185 at the drain electrode 160 of MOSFET $T_5$ and the drain electrode 190 of the MOSFET $T_4$ is directly connected with the output 80 of the impedance converter $O_1$. The readjustment or follow-up of the charging voltage of the auxiliary simulator 2 to the charging voltage of the primary simulator 1 occurs through the agency of the MOSFET $T_3$ which is rendered conductive via the control signal $U_{sen}$. The impressing of the charging voltage of the auxiliary simulator 2 upon the primary simulator 1 occurs through the agency of the resistor $R_{10}$ and the transistor $T_6$.

The circuitry comprising $R_{10}$ and $T_6$ (FIG. 5) is an intermediate amplifier used to relieve the MOSFET $T_5$. MOSFET $T_5$ delivers via its drain electrode a control current signal to the intermediate amplifier. The discharge current of $C_1$ (regulating the charging voltage of $C_1$) passes diode $D_2$ and flows via emitter and collector of $T_6$ to ground.

In the circuit arrangement of FIG. 6 there are used p-channel-MOSFETs of the enhancement-type, so that as a matter of convenience the same reference characters obviously may be still used. The field-effect transistor $T_1$ which is connected to the first capacitor $C_1$ of the primary simulator is a n-channel-field-effect transistor (FET). In the case of the differential amplifier $O_2$ the drain electrode 190 of the MOSFET $T_4$ is connected via a resistor $R_{11}$ with the output 80 of the impedance converter $O_1$. The base-emitter-path 195,200 of a pnp-transistor $T_8$ is connected in parallel with the resistor $R_{11}$ and the collector 205 thereof is connected in circuit with the source-electrodes 105 and 110 of the MOSFETs $T_4$ and $T_5$ and the resistor $R_{12}$. The diode $D_4$ is directly reverse or back-to-back connected with regard to the diode $D_2$. The reference of the simulator voltage in this case occurs, as mentioned, via a separate voltage divider $R_7$, $R_8$ from the sample and hold circuit. The impressing of the starting conditions upon the first capacitor $C_1$ of the primary simulator 1 occurs via the MOSFET $T_5$ and the resistor $R_{10}$, and the primary simulator 1 is recharged for such length of time until the voltage drop at the MOSFET $T_3$ is equal to null. With the null cross-over the MOSFET $T_4$ carries the base current of the differential amplifier $O_2$ and by means of the transistor $T_8$ the transconductance of MOSFET $T_4$ is increased by its current gain, so that the MOSFET $T_4$ also remains practically without current when the MOSFET $T_5$ is completely blocked or non-conductive. Since in the balanced state both MOSFETs are practically without current and additionally there is applied to both the same source-drain-voltage, there is realized an increase accuracy of the impressing or simulating operation. With this circuit arrangement the second capacitor $C_2$ of the primary simulator 1 is also used in the simulating or impressing operation. To this end there is connected to the second capacitor $C_2$ a n-channel-field-effect transistor $T_2$, at the gate of which there is likewise applied the clock pulses by means of the connection terminal $K_3$. The source-electrode 215 of this field-effect transistor $T_2$ is connected via a diode $D_3$ with the output 80 of the impedance converter $O_1$ and with the emitter 200 of the transistor $T_8$. The impressing or superposing of the starting condition at the second capacitor $C_2$ in this case accordingly occurs indirectly via the impedance converter $O_1$. Consequently, it is not necessary to design the simulating-circuit arrangement for different magnitudes and starting voltages of the capacitor $C_2$. Since, during normal operation, the charging voltage at the first capacitor $C_1$ is always greater than that at the second capacitor $C_2$, the capacitor $C_2$ is not influenced. During the rest cycles with the clocked supply of the primary simulator 1 the field-effect transistor $T_2$ is blocked, so that there also cannot be transmitted any disturbance voltage peaks to the second capacitor $C_2$ and by means of which its charging state would be falsified.

Owing to the high-ohmic or high-impedance characteristics of the circuit arrangement the gate-input of the MOSFET $T_4$ is quite prone to disturbances. This disturbance sensitivity is reduced with the aid of a capacitor $C_4$ connected in parallel with the auxiliary simulator-resistor $R_3$, the size or dimension in any event is markedly limited by the time-constant $R_3$, $C_4$ disturbing the simulating operation, and by screening the "hot" points of the circuit arrangement.

While there is shown and described present preferred embodiments of the invention, it is to be distinctly understood that the invention is not limited thereto, but may be otherwise variously embodied and practiced within the scope of the following claims.

Accordingly, what is claimed is:

1. A circuit arrangement for superposing initial conditions upon a primary thermal simulator for electrical operating means fed by a power supply, the primary simulator comprising RC-elements embodying a first RC-element having a first time constant and containing a first resistor and a first capacitor and a second RC-element having a second time constant different from the first time constant and containing a second resistor and a second capacitor, said primary simulator being a thermal simulator network which is charged by a charging current functionally dependent upon operating current of the operating means to a charging voltage representative of thermal behavior or temperature rise of the operating means, a sample and hold device having a low-impedance output, said charging voltage appearing at the low-impedance output of the sample and hold device for controlling an electrical operating means-protection relay fed by the power supply, the improvement comprising: an auxiliary simulator comprising a RC-element including a resistor and a capacitor and having a time-constant greater than one-half the smallest time-constant of the primary simulator and smaller than twice the largest time-constant of the primary simulator, switching means responsive to power supply voltage, said auxiliary simulator when the power supply for the protection relay is intact being connected by means of the switching means with the sample and hold device for the adjustment of the charging voltage of the auxiliary simulator-capacitor to the charging voltage of the primary simulator, said auxiliary simulator with faulty power supply for the protection relay being disconnected by means of said switching means from the sample and hold device to safeguard against undesired discharges, an impedance converter in circuit with said switching means, said auxiliary simulator upon recurrence of the power supply for the protection relay being temporarily connected via said impedance converter with the primary simulator for recharging the first capacitor of the first RC-element of the primary simulator to the charging voltage of the auxiliary simulator.

2. The circuit arrangement as defined in claim 1, the simulator network including voltage divider means for applying low end potentials at the first and second capacitors of the primary simulator in order to prevent defects brought about by leakage currents of the first and second capacitors, said voltage divider means applying to the second capacitor of the primary simulator a low end potential which is less than an optimum low end potential.

3. The circuit arrangement as defined in claim 1, including means defining a discharge circuit containing a diode and electrically connected in circuit with the second capacitor of the primary simulator, said diode including an anode, said diode being connected in circuit at the side of the anode with the second capacitor of the primary simulator in order to recharge the second capacitor of the primary simulator to the charging voltage of the first capacitor of the primary simulator when the charging voltage is positive.

4. The circuit arrangement as defined in claim 3, wherein the second capacitor of the primary simulator is connected in circuit by means of the diode of the discharge circuit with the first capacitor of the primary simulator.

5. The circuit arrangement as defined in claim 3, the simulator network including voltage divider means for applying low end potentials to the first and second capacitors of the primary simulator in order to obtain an optimum simulation of the thermal behavior of the electrical operating means.

6. The circuit arrangement as defined in claim 1, wherein the switching means is responsive to control pulses for adjusting the charging voltage of the auxiliary simulator, said switching means comprising a MOSFET having gate, drain and source electrodes, means for applying to the gate electrode a control pulse, means including a voltage divider for applying to the source electrode a fraction of the charging voltage of the primary simulator which is tapped-off of said voltage divider, said auxiliary simulator being connected in circuit with said drain electrode, said impedance converter comprising MOSFET-differential amplifier means having two inputs, one of the inputs of the differential amplifier means being connected in circuit with the auxiliary simulator-resistor and the other input of the differential amplifier means being connected in circuit with said voltage divider, impedance converter means having an output, the one differential amplifier-MOSFET having a drain electrode connected with said output of said impedance converter means, the other differential amplifier-MOSFET having a drain electrode connected via a switching element of the switching means responsive to control pulses with the first capacitor of the primary simulator.

7. The circuit arrangement as defined in claim 6, wherein the differential amplifier means is provided with a load resistance each MOSFET having a substrate electrode, the substrate electrodes of the MOSFET-differential-amplifier means and the substrate electrode of the MOSFET of the switching means being connected in circuit with said load resistance of the differential amplifier means for the purpose of substrate adjustment.

8. The circuit arrangement as defined in claim 6, wherein said switching element of the switching means responsive to control pulses comprises a diode which is prebiased in its blocking direction by a control pulse for intact operating power supply.

9. The circuit arrangement as defined in claim 1, wherein the switching means is responsive to control pulses for adjusting the charging voltage of the auxiliary simulator, said switching means comprising a MOSFET having gate, drain and source electrodes, means for applying to the gate electrode a control pulse, means including a voltage divider for applying to the source electrode a fraction of the charging voltage of the primary simulator which is tapped-off of said voltage divider, said auxiliary simulator being connected in circuit with said drain electrode, said impedance converter comprising MOSFET-differential amplifier means having two inputs, one of the inputs of the differential amplifier means being connected in circuit with the auxiliary simulator-resistor and the other input of the differential amplifier means being connected in circuit with said voltage divider, impedance converter means having an input and an output, the one differential amplifier-MOSFET having a drain electrode connected with said output of said impedance converter means, the other differential amplifier-MOSFET having a drain electrode connected via a switching element of the switching means responsive to control pulses with the first capacitor of the primary simulator, the differential amplifier means being provided with a load resistance, each MOSFET having a substrate electrode, the substrate electrodes of the MOSFET-differential amplifier means and the substrate electrode of the MOSFET of the switching means being connected in circuit with said load resistance of the differential amplifier means for the purpose of substrate adjustment, said switching element of the switching means responsive to control pulses comprises a diode which is prebiased in its blocking direction by a control pulse for intact operating power supply, an electronic switch including means defining a switching path, a charging current source, said primary simulator for operation with clocked charging current being connected via the switching path of the electronic switch controlled by clock pulses with the charging current source, said input of the impedance converter means and the diode of the switching means.

10. The circuit arrangement as defined in claim 9, further including means defining a discharge circuit containing a diode element and electrically connected in circuit with the second capacitor of the primary simulator, said diode element including an anode, said diode element being connected in circuit at the side of the anode with the second capacitor of the primary simulator in order to recharge the second capacitor of the primary simulator to the charging voltage of the first capacitor of the primary simulator when the charging voltage is positive, the discharge circuit comprising a further electronic switch controlled by the clock pulses and a diode means connected in series therewith for recharging the second capacitor of the primary simulator, said discharge circuit of the second capacitor of the primary simulator being connected with the output of the impedance converter means.

11. A circuit arrangement for impressing initial conditions upon primary thermal simulator circuit means for electrical operating means, fed by a power supply means, the primary simulator circuit means comprising RC-elements embodying a first RC-element having a first time constant and containing a first resistor and a first capacitor and a second RC-element having a time constant different from the first time constant and containing a second resistor and a second capacitor, said primary simulator circuit means being charged by a charging current functionally dependent upon the operating current of the operating means to a charging voltage representative of thermal behavior or temperature rise of the operating means, a sample and hold device having a low-impedance output, said charging voltage appearing at the low-impedance output of the sample and hold device for controlling an electrical operating means-protection relay fed by the power supply, an auxiliary simulator circuit means comprising a RC-element including a resistor and a capacitor and having a time-constant greater than one-half the smallest time-constant of the primary simulator circuit means and smaller than twice the largest time-constant of the primary simulator circuit means, switching means responsive to power supply voltage, said auxiliary simulator circuit means when the power supply for the protection relay is intact being connected by means of the switching means with the sample and hold device for the adjustment of the charging voltage of the auxiliary simulator-capacitor to the charging voltage of the primary simulator circuit means, said auxiliary simulator circuit means with faulty power supply for the protection relay being disconnected by means of said switching means from the sample and hold device to safeguard against undesired discharges, an impedance converter in circuit with said switching means, said auxiliary simulator circuit means upon recurrence of the power supply for the protection relay being temporarily connected via said impedance converter with the primary simulator circuit means for recharging the first capacitor of the first RC-element of the primary simulator circuit means to the charging voltage of the auxiliary simulator circuit means.

* * * * *